(No Model.)
W. SCHRADER.
FORCE ACCUMULATOR.
No. 456,525.　　　　　　　　Patented July 21, 1891.
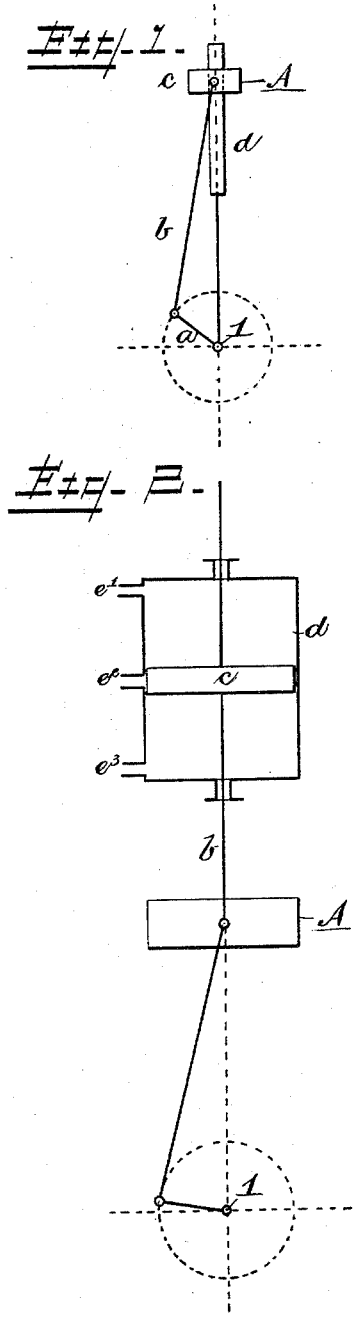
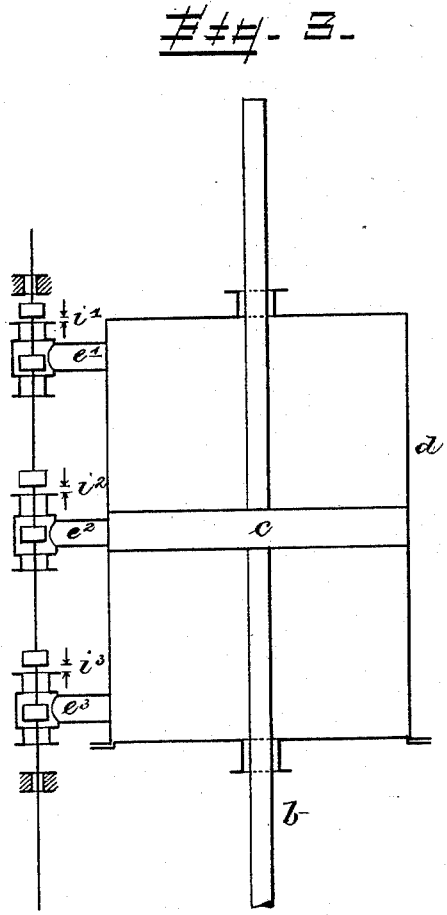
Witnesses
A. B. Blackwood
Carleton E. Snell
Inventor
Wolfgang Schrader
by Arthur C. Fraser and Co.
his Attorneys

UNITED STATES PATENT OFFICE.

WOLFGANG SCHRADER, OF BERLIN, GERMANY, ASSIGNOR TO C. L. P. FLECK SÖHNE, OF SAME PLACE.

FORCE-ACCUMULATOR.

SPECIFICATION forming part of Letters Patent No. 456,525, dated July 21, 1891.

Application filed June 14, 1889. Serial No. 314,221. (No model.)

*To all whom it may concern:*

Be it known that I, WOLFGANG SCHRADER, a subject of the Emperor of Germany, residing in the city of Berlin, in the Kingdom of Prussia, German Empire, have invented certain Improvements in Force-Accumulators, of which the following is a specification.

The invention is illustrated in the accompanying drawings, in which—

Figure 1 is a diagram of a moving body actuated by a crank and a connecting-rod. Fig. 2 is a view of a force-accumulator applied to a moving body. Fig. 3 illustrates a valve mechanism.

In steam-engines and other motors, and in all classes of machinery wherein the moving force is applied in a single direction, it is desirable that the momentum of the moving parts should be stored up, so that the same may be utilized to assist the motive power. Fig. 1 shows as an example a well-known arrangement of machinery, 1 being a power-shaft, $a$ a crank carried thereby, A a moving mass moving in a rectilinear path, and $b$ a connecting-rod between the crank $a$ and the mass or body A. In such single-acting engines the power of the driving force is ordinarily exerted only on what may be called the "outstroke" of the body A, the momentum of the parts being relied upon to bring back the body A to its original position. In order that the outstroke in such instances as these may be rendered effective, accumulators are provided in accordance with the present invention for storing up the momentum produced by the outstroke and rendering the same effective on the instroke.

For crank-gear, which is the most important case, Fig. 2 shows the arrangement of an air-tension device as the accumulator. With the reciprocating body A is united by a piston-rod C a piston $c$, moving back and forth in a cylinder $d$ filled with air. When the ducts $e$ in the cylinder $d$, communicating with the outer air, are closed, the air in front of the piston will be compressed during the forward motion of the piston and that behind the piston will be expanded. The closing of the ducts $e$ may be done by hand or automatically by any suitable mechanism, and is effected in such manner that when the piston arrives at the end of its stroke compressed air is produced in front of the piston, while air of atmospheric pressure is in the cylinder behind it. The force thus accumulated by the compression of the air is rendered effective by the expansion of the air on the return-stroke, and in this manner the accumulated or stored-up work is given back.

It is clear that the speed (numbers of revolutions) of the devices furnished with the above-described accumulator may be increased quite at pleasure without fear of blows, shocks, vibrations, &c. In a high-speed engine or machine, however, it would happen in starting the engine or machine provided with one of the accumulators that the air would be compressed at the outset to an excessive degree, since the construction of the accumulator would be such that the degree of compression would correspond to the standard speed of the continuously-rotating shaft. Hence it would be nearly impossible to start the machine. For such cases provisions are made, so that at the starting of the machine the piston $c$, Fig. 2, moves freely in its cylinder without materially compressing the air. To attain this object all three ducts $e'$ $e^2$ $e^3$ are opened at the start. After the machine reaches a certain speed the two extreme ducts $e'$ and $e^3$ are closed, and only when the machine has attained nearly the normal speed is the middle duct $e^2$ finally closed.

The opening and closing of the ducts may be done by hand or by a regulating mechanism. As shown in Fig. 3, a balanced valve-gear is employed as the regulating mechanism. The valves are arranged in such manner that for closing the ducts $e'$ and $e^3$ the valve-bar has to travel the distance $i'$ or $i^3$; but for closing the middle duct $e^2$ a longer distance $i^2$. The particular construction of the regulator itself is immaterial, and may be made according to circumstances of any suitable design. In machines having a very long stroke more than three ducts may be arranged in a similar way.

The use of the invention extends to machines having rapidly-moving masses without being limited by the objects for which the machines are intended.

I claim as my invention—

In a force-accumulator, a cylinder and a piston therein, in combination with a plurality of ducts establishing communication between the exterior air and the interior of said cylinder, each duct being furnished with a valve, said valves being actuated in such manner that at first the two extreme valves are closed and then the intermediate one, substantially as and for the purpose set forth.

In witness whereof I have hereunto signed my name in the presence of two subscribing witnesses.

WOLFGANG SCHRADER.

Witnesses:
CARL T. BURCHARDT,
CHAPMAN COLEMAN.